United States Patent
Gibson, III

(10) Patent No.: US 8,521,649 B2
(45) Date of Patent: Aug. 27, 2013

(54) SYSTEM, METHOD, AND APPARATUS FOR FUNDS TRANSFER

(75) Inventor: Charles N Gibson, III, Tampa, FL (US)

(73) Assignee: CNG3 Holdings, Inc., Tampa, FL (US)

( * ) Notice: Subject to any disclaimer, the term of this patent is extended or adjusted under 35 U.S.C. 154(b) by 67 days.

(21) Appl. No.: 13/153,624

(22) Filed: Jun. 6, 2011

(65) Prior Publication Data

US 2012/0310827 A1 Dec. 6, 2012

(51) Int. Cl.
*G06Q 40/02* (2012.01)
*G06Q 20/20* (2012.01)

(52) U.S. Cl.
CPC .................. *G06Q 20/206* (2013.01)
USPC ............................................................. 705/42

(58) Field of Classification Search
None
See application file for complete search history.

(56) References Cited

U.S. PATENT DOCUMENTS

| | | | |
|---|---|---|---|
| 8,315,948 B2 * | 11/2012 | Walker et al. | 705/50 |
| 2007/0208816 A1 | 9/2007 | Baldwin et al. | |
| 2008/0147549 A1 | 6/2008 | Rathbun et al. | |
| 2009/0204530 A1 * | 8/2009 | Hanson | 705/35 |
| 2011/0238473 A1 * | 9/2011 | Sankolli et al. | 705/14.23 |
| 2012/0047070 A1 * | 2/2012 | Pharris | 705/43 |
| 2012/0072329 A1 * | 3/2012 | Senior | 705/37 |
| 2012/0158534 A1 * | 6/2012 | Barlow | 705/26.3 |

* cited by examiner

*Primary Examiner* — Bruce I Ebersman
(74) *Attorney, Agent, or Firm* — Smith & Hopen, P.A.

(57) ABSTRACT

A computer-based funds transfer system provides funds transfer by making a request of a cash amount from an authorized device, then, responsive to the request, the authorized device transmits the request to a transaction server where the transaction server allocates funds and sends a code back to the authorized device. The authorized device displays the code as a bar code and the bar code is scanned by a terminal/system of a recipient. The terminal/system of the recipient sends the code and the cash amount to the transaction server. The transaction server validates the request and, if approved, sends a confirmation back to the recipient terminal/system and debits the user's account for the cash amount and the transaction server initiates a cash transfer to the recipient.

18 Claims, 12 Drawing Sheets

SYSTEM, METHOD, AND APPARATUS FOR FUNDS TRANSFER

FIELD

This invention relates to the field of funds transfer and more particularly to a system for providing funds transfer using a displayed bar code and bar code scanner.

BACKGROUND

There are many payment systems in use today. The simplest is good hard currency. In such, one makes a transaction and, in return for the goods or services, provides hard currency (e.g. money, cash, paper, coin, etc.) sufficient to cover the cost of the transaction. This method has been in use for thousands of years and still works well today with some notable exceptions. Hard currency is not good for very large transactions such as the purchase of a vehicle, home or business. Even for smaller transactions, a person having or carrying hard currency is subject to theft of that currency. It is difficult to make remote transactions using hard currency. For example, making a transaction over the phone or over the Internet requires payment before shipment of the goods, so the hard currency has to be shipped to the seller and is subject to theft along the way.

To facilitate safer movement of currency, the banking industry initiated the use of checks. It is rumored that the Romans invented checking in the $4^{th}$ century, but the first wide-spread use of checks was likely in Holland around the $16^{th}$ century. A check is written against a checking account with a bank, provide to the recipient in lieu of hard currency and the recipient redeems the check at their bank for hard currency or as a credit to their own account. Checks provided ways for people to pay large amounts and to pay over great distances. Checks became the de facto standard for paying bills in the mail. Still, checks slowed down transactions because the recipient was not guaranteed that the payment was made until the check cleared the banking systems and the check amount was deducted from the payee's account, often taking 3-6 days. Also, many situations do not permit payment by check because there is no guarantee that the check will clear unless the payee is known by the recipient or unless the check is certified (e.g., the bank has already withdrawn the funds from the payee's account).

To improve customer loyalty, in the early 1900s, some oil companies and department stores issued their own proprietary credit cards that could only be used at their gas station or stores. This was the beginning of credit cards. Around 1950, the Diners Club card was invented and used mainly for travel and entertainment. The first "plastic" credit card was the American Express card in the late 1950s. In those days, paper transactions were made with the charge card and later cleared through the issuer of the card and billed to the individual making the charge. Today, many people have several charge cards and almost every transaction is made electronically, appearing on the payee's account within one day of the transaction. The credit card provides a relatively safe form of payment since the holder's liability is limited for false transactions, works at great distances and, if the bill is paid quickly, has little expense for the card holder (the merchants are usually charged a fee for each transaction). One problem with credit cards is, if a thief obtains enough information to make charges on your credit card, it is often difficult to notify your bank, change your account number and resume normal activities. Another problem with credit cards is that they provide credit to the card holder and, often, the card holder makes more purchases, getting themselves into debt without having the means to get out of that debt.

Another similar payment device created for those who can't control spending with credit cards is the debit card which is similar to the credit card, except each transaction is immediately deducted from the holder's account. Therefore, if the holder has insufficient funds to make a certain transaction, the transaction is refused.

Other various systems have been in place to expedite transactions made over the Internet. In the early years of the Internet, it was not wise to provide your credit card number to a remote retailer and often, after such a transaction, "hackers" would know your credit card number and make unauthorized transactions, requiring the card holder to notify the issuing company, change all of their records and, in rare cases, pay a minimum fee. To overcome this issue, a system called Paypal was created, particularly for use with an on-line auction system called eBay. Paypal enabled prompt payment for goods and services without providing a credit card number and worked very well for Internet purchase, but was not extensible to many transactions where a credit card is useful such as paying for goods at a retail establishment.

Today, many people do not leave home without a wallet that is usually full of credit cards and a small amount of money, and a cellular phone, a cell phone. Although it is not always evident that a person is carrying a wallet, you can usually see their cell phone as the call people while in the car, walk around airports and malls talking to people, sending text messages. For some classes of society, almost every member has a cell phone starting at age seven or eight. It has been estimated that nine out of ten adults have a cell phone.

Since the cell phone is now so prevalent and because of the rapid increase of the cell phones processing, input and display capability, the cell phone has started to displace the credit card in certain transactional situations. For example, Starbucks coffee shops has deployed a system in which the users prepay into an account through PayPal or a credit card, then load an application (App) onto their smart cell phone. The cell phone then replaces the user's plastic card, displaying a bar code that represents the user's account number. Anyone finding someone's cell phone can access the account and make purchases. After a purchase, the app displays the bar code and it is scanned by a bar code scanner that communicates the account number to the register and the account is verified, checked for sufficient balance, debited and the transaction is complete.

Another service called FaceCash requires the user to create an account and fund the account (e.g. deposit money) and this works like a debit card from your cellular phone. A bar code with your account number is displayed on your cell phone display and is scanned by the retailer. After scanning, the retailer is shown an image of the user of the account for facial validation. Once validated, the retailer enters the transaction amount and that amount is deducted from the user's account and credited to the retailer. This is similar to a debit card with an image of the holder of the card. FaceCash provides the account number (through a scan of the bar code) to the retailer. Once the retailer has the account number, there seems to be nothing to prevent the retailer or a hacker from over charging or fraudulently charging the account.

These systems do not provide a complete, secure, cell phone based transactional service. What is needed is a system that will deliver utilize existing technology devices for transferring funds in a secure system.

SUMMARY

In one embodiment, a computer-based funds transfer system is disclosed including a client device that has a processor and a display, a transaction server computer system, a bar code reader, and an establishment computer system. The bar code reader is operatively coupled to the establishment computer system and the client device, transaction server computer system and establishment computer system are communicatively coupled.

Software running on the transaction server computer system receives a payment initiation transaction from the client device (e.g. responsive to the user/payee entering an amount in an app running on the client device). The payment initiation transaction includes the cash amount. The software allocates funds covering the cash amount and transmits a code back to the client device in an approval transaction. A bar code representing the code is displayed on the display of the client device and the bar code is scanned by the bar code reader. Responsive to the scanning of the bar code, the establishment computer system converts the bar code into the code and sends a payment request transaction to the transaction server computer system. The payment request transaction includes the cash amount and the code. After verification, the software running on the transaction server computer system approves the payment request transaction, sends a payment confirmation transaction to the establishment computer system and debits the cash amount from the funds.

In another embodiment, a method of transferring funds to a recipient is disclosed. The method of transferring funds to a recipient includes (a) owing the recipient a cash amount and (b) entering the cash amount at a client device (e.g. typing the cash amount into an app). (c) A payment initiation transaction is transferred from the client device to a transaction server. The payment initiation transaction includes authorization data and the cash amount. (d) Responsive to receiving the payment initiation transaction at the transaction server, funds are allocated to cover the cash amount. (e) An approval transaction is transmitted from the transaction server to the client device. The approval transaction contains a code. (f) The code is displayed as a bar code on the display of the client device. (g) The bar code being displayed on the display is scanned by a scanning device which is interfaced to a recipient system. A (h) payment request transaction is sent from the recipient system to the transaction server. The payment request transaction includes the code and the cash amount. (i) Responsive to receiving the payment request transaction, the transaction server validates the code and the cash amount. (j) If the code and the cash amount are correct, the cash amount is debited from the funds and a payment confirmation transaction is sent from the transaction server to the recipient system. Finally, (k) the cash amount is transferred to the recipient as known in the industry (e.g. by printed check, funds transfer, credit to an account of the recipient, etc).

In another embodiment, a computer-based funds transfer system is disclosed. The computer-based funds transfer system includes a client device that has a first processor and a display, a transaction server computer system and a recipient device. The recipient device has processor, a display and a device for reading a bar code. A first set of software instructions runs on the client device (e.g. an app) and receive a cash amount from a user of the client device. The first set of software instructions creates a payment initiation transaction that includes the cash amount, and transmits the payment initiation transaction to the transaction server computer system. A second set of software instructions runs on the transaction server computer system. The second set of software instructions receives the payment initiation transaction from the client device, allocates funds covering the cash amount, creates a code, creates an approval transaction comprising the code, and transmits the approval transaction to the client device. Responsive to receiving the approval transaction, the first set of software instructions displays the code as a displayed bar code on the display. A third set of software instructions running on the recipient device receives the code from the device for reading the bar code, creates a payment request transaction, and sends the payment request transaction to the transaction server computer system. The payment request transaction includes the cash amount and the code. The second set of software instructions receives the payment request transaction, verifies the code and the cash amount, creates a payment confirmation transaction, sends the payment confirmation transaction to the recipient device and debits the cash amount from the funds. The third set of software instructions receives the payment confirmation transaction and displays an approval confirmation message on the display of the recipient device.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
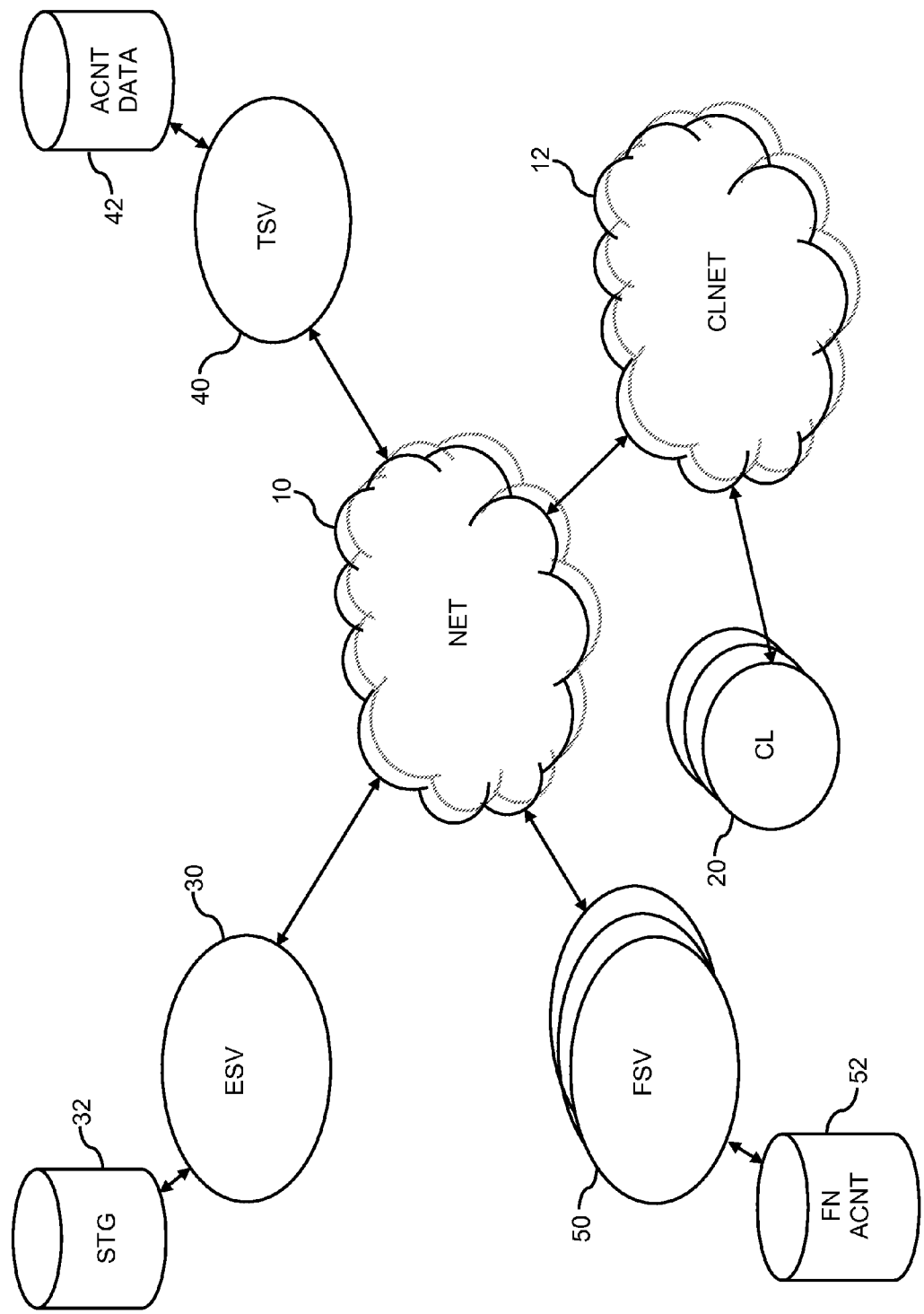
FIG. 1 illustrates a schematic view of a computer-based funds transfer system.

Reference will now be made in detail to the presently preferred embodiments of the invention, examples of which are illustrated in the accompanying drawings. Throughout the following detailed description, the same reference numerals refer to the same elements in all figures. The disclosed system operates on any device that has a display and is communicatively coupled to the system. Throughout this description, the preferred device is shown as a cellular phone having a graphics display capable of displaying a bar code. Notwithstanding, any device capable of displaying a bar code and communicatively coupled to the system is anticipated including, but not limited to, radios, music players, watches, etc.

Referring to FIG. 1, a schematic view of a computer-based funds transfer system is shown. The interplay between the various systems will be described later. Shown in this exemplary system is a transaction server 40 having access to storage 42, the storage containing, among other things, account data 42. In some embodiments, the account data includes credit and/or debit amounts for each account. In some embodiments, the account data includes account information for one or more external accounts at one or more external financial institutions and, optionally, a "pecking" order providing instructions as to how and when to access the one or more external accounts. For example, one exemplary account data 42 contains a credit of $3.83 and two external accounts, a checking account at a local bank and a Visa card. The account data pecking order indicates that for all transactions, use any credit amount first, then attempt to satisfy the remainder of the transaction from the checking account, then, if still short, attempt to satisfy the remainder of the transaction from the Visa account. In another example, one exemplary account data 42 contains two external accounts, a Visa card and a Master Card. The account data pecking order indicates for all transactions occurring on the $1^{st}$ to the $15^{th}$ of the month, use the Visa account and for all transactions occurring on the $16^{th}$ to the end of the month, use the Master Card account. Any combination and order of accounts is anticipated.

Also shown is a computing system or server 30 of an enterprise at which a transaction is being made. The enterprise server 30 also has storage 32 for storing the customer's bill (e.g. amount due, transaction information, etc). There are also one or more financial systems 50, each having financial account information 52 in a storage. An example of a financial system 50 is a bank, credit card company, PayPal, etc. The various computer systems 30/40/50 of this exemplary system are interconnected as known in the industry, for example through a network 10 such as the Internet.

Although not required, it is anticipated that some or all transactions between the various computer systems 30/40/50 are properly encoded and encrypted so as to prevent theft of information, hacking, replay of requests, reuse of payment codes, etc. Various encoding and encryption mechanisms are known in the industry such as transport layer security (TLS) and/or session layer encryption such as Secure Sockets Layer (SSL) encryption. Mechanisms such as these are used, for example, to protect merchant transaction on the Internet in which a person provides a credit card number.

A set of client devices 20 are shown. Some client devices 20 such as tablet PCs connect to the transaction server 40 through the network 10 (Internet) while other client devices 20 such as cell phones 20 connect through the cellular network 12 (e.g. cell towers, cellular infrastructure, etc.) and through the Internet 10 to the transaction server 40.

Figure 2:
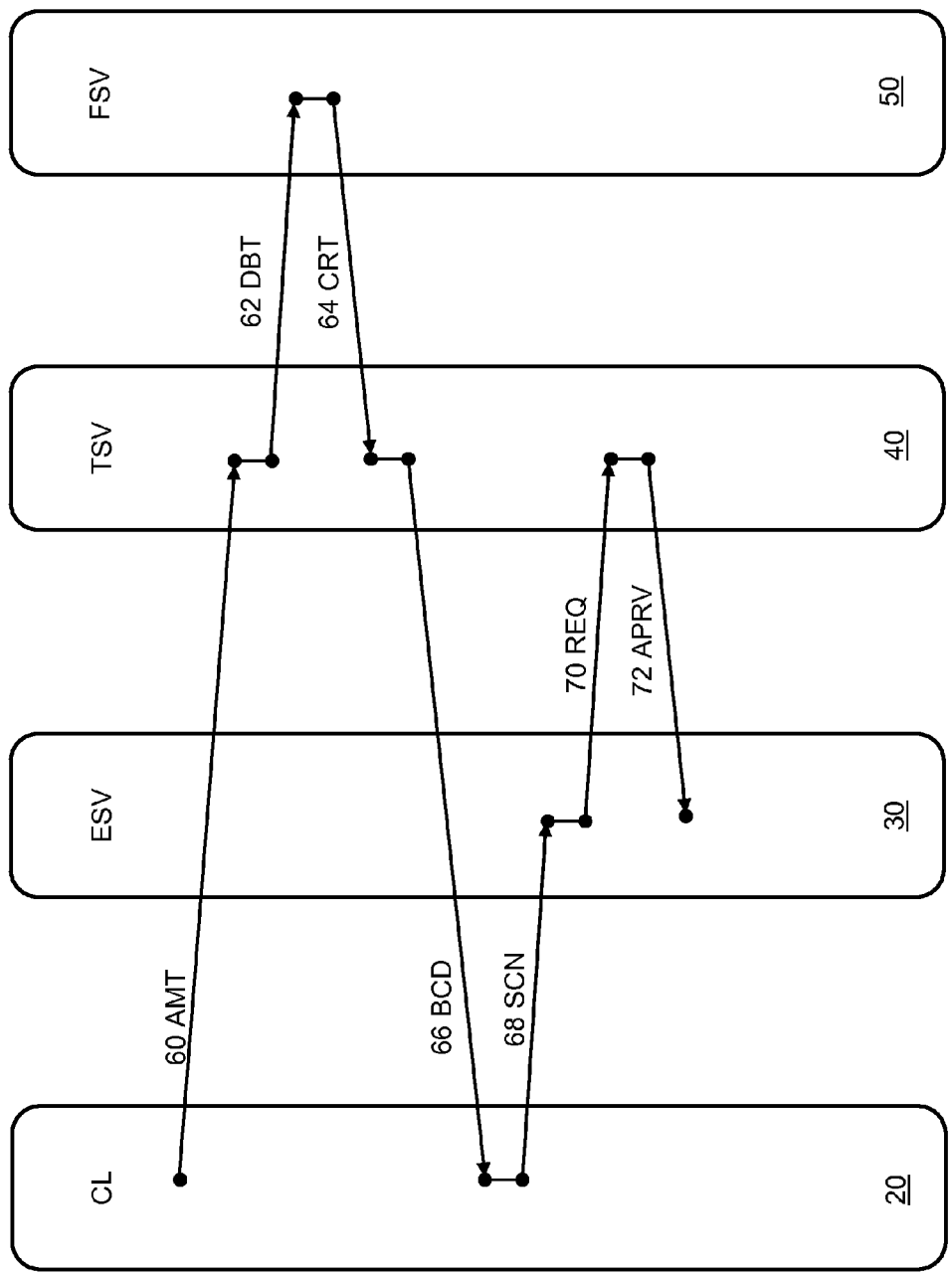
FIG. 2 illustrates a typical transaction flow in a computer-based funds transfer system.

Referring to FIG. 2, a typical transaction flow in a computer-based funds transfer system is shown. After making a financial transaction (e.g. purchase), the user starts an application on their client device 20 (e.g. cellular phone 20). The user enters the amount of the transaction into the application and the application sends a payment initiation transaction 60 to the transaction server 40 including the amount of the transaction and other security information that tells the transaction server 40 that this is a trusted client 20. If the user's account at the transaction server 40 does not have sufficient funds to cover the amount of the transaction, the transaction server 40 contacts one or more external financial servers 50 (e.g. banks, credit card companies, etc.) by debit transactions 62 (as known in the industry) to obtain sufficient funds as to cover the amount of the transaction. In some embodiments, the transaction server 40 maintains an account for each user that has a credit and, in some embodiments, a debit. Any combination of local accounts and external financial accounts is anticipated.

For each debit transaction 62 to one or more financial servers 50, a credit transaction 64 is received. In some cases, the credit transaction 64 indicates that the debit transaction 62 failed, in which case, additional credit transactions 64 are made to other financial servers 50 until sufficient funds are collected to cover the amount of the transaction. After attempting to obtain funds from all possible internal and external accounts accessible by the user, if there are not sufficient funds to cover the amount of the transaction, an error is returned to the app (not shown) indicating that the transaction cannot be completed.

Once sufficient funds to cover the amount of the transaction are accumulated, an approval transaction 66 is sent to the app. This transaction includes a code 21, either as data or encoded in a bar code 21 (see FIG. 3) such as a quick response (QR) bar code. If the code 21 is encoded as data, the app formats the data into a bar code 21 such as a QR code. In either case, the code 21 is displayed on the display of the cell phone 20 and is scanned 68 by a scanner 290 (see FIG. 10) or other image scanning device such as a camera 390 (see FIG. 11) associated with the payee. From this scan, the code is captured into the server/computer 30 of the establishment. The server/computer 30 of the establishment treats the code as any other coupon that was scanned; only in this case, the code (from the bar code) indicates that the coupon is for the amount of the transaction. The server/computer 30 then makes a request for payment of the coupon 72 (payment request transaction 72) to the transaction server 40 and honors the coupon request 70 with a payment confirmation transaction 72 and transfers funds in the amount of the transaction amount to the establishment. In some embodiments, the transaction server 40 compares the amount of the coupon to the amount requested in the payment initiation transaction 60 and, if they are the same, honors the coupon request 70 with a payment confirmation transaction 72 and transfers funds in the amount of the transaction amount to the establishment. In these embodiments, if the amounts don't correlate, an error 72 is returned and the establishment must request payment by other means.

In some embodiments, the server/computer 30 of the establishment also includes information regarding the purchase in the transaction that is sent to the transaction server 40. For example, in some embodiments, this information includes a list of items purchased, quantities, unit price, extended price, tax, name of establishment, phone number of establishment, time of transaction, and date of transaction. This information regarding the purchase is, for example, used to identify each transaction on a monthly statement and, in some embodiments, to summarize expenses (e.g. yearly amount spent on coffee, etc.). In some embodiments, the information regarding the purchase is used to generate a retail score, similar to a credit score. The retail score is useful in determining a buyer's past buying habits for future prediction of purchases. For example, a marketing company does not send advertisements to a buyer with a low retail score because that buyer is less likely to purchase from them.

Since the code 21 is a unique number (see FIG. 9), the code 21 is limited to a single use. Once used, the computer-based funds transfer system retires the code so that any attempt to reuse the code 21 will fail.

It is anticipated that the code 21 and associated transaction data is retained in the computer-based funds transfer system for a determinate amount of time and is valid until that time lapses or the code 21 is used. In such, it is anticipated that the code have a life-span that is either selected by the computer-based funds transfer system or by the user of the system. In such, once the code 21 is generated, the code is usable for the life-span. Given such, it is anticipated that, in some uses, the code 21 is printed, for example in a birthday card and provided as a birthday gift, and the code 21 is later redeemed by the recipient as long as the code 21 has not expired. It is also anticipated that in some embodiments, the code 21 is emailed to the recipient and redeemed at the leisure of the recipient as long as the lafe-span does not expire.

Figure 3:
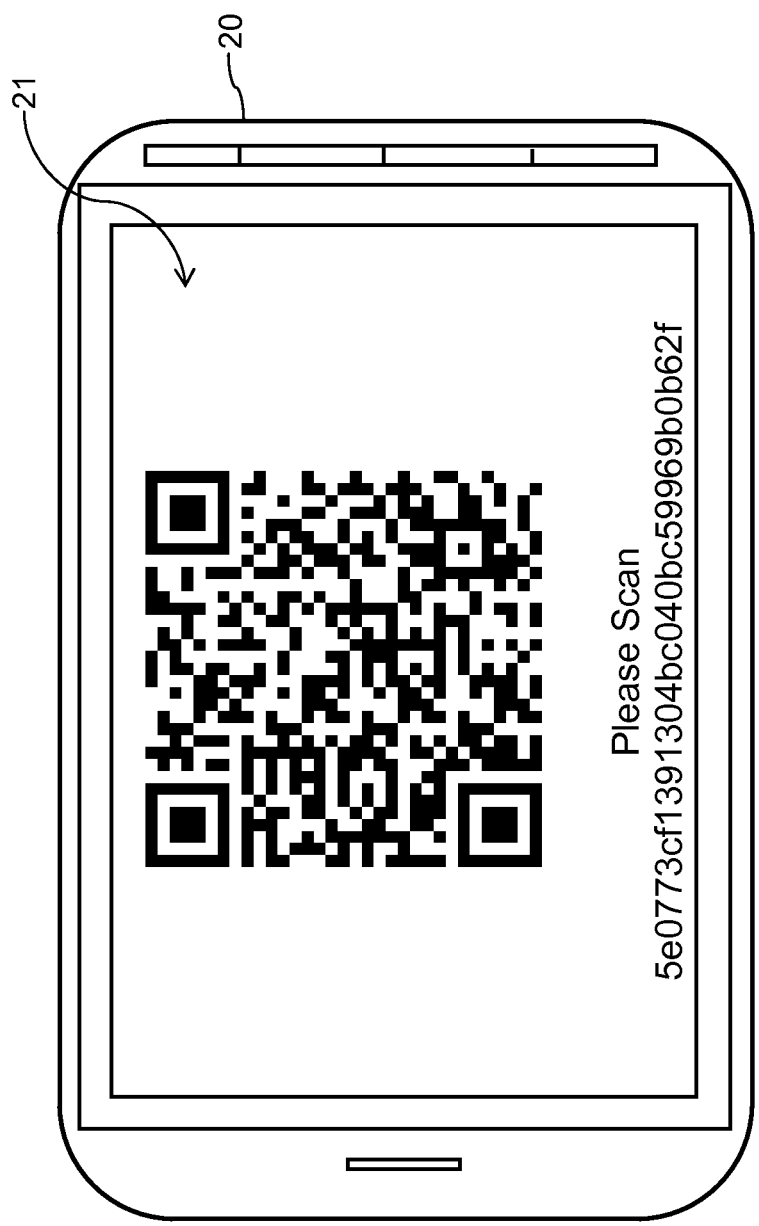
FIG. 3 illustrates a typical bar code display in the computer-based funds transfer system.

Referring to FIG. 3, a typical bar code display 21 in the computer-based funds transfer system is shown. In this example, the client device 20 is a cellular phone 20 such as an I-phone or Droid, as known in the industry. After receipt of the transaction 66 containing the code (or formatted bar code), the application (applications are typically called "apps") displays the bar code 21. Although shown as a 2-dimensional bar code 21, any known bar code representation is anticipated. Barcodes are basically a printed or displayed representation of data that is optically scannable by a scanner into a computer system. The data are often serial numbers, coupon codes, costs, product identification numbers, quantities, etc. Barcodes operate on a simple principle of sequences of alternating black and white or different color stripes/characters. The data is encoded into the barcode by a specific altering of these stripes/characters to present a pattern of these stripes/characters that are later scanned and recognized by a computer system.

There are many standards for barcodes, for example, linear and two dimensional. Linear barcodes are the best known and consist of a linear set of thin or thick black bars separated by thin or thick white spaces. Two dimensional barcodes contain more data and appear as a cluster of black and white squares. As an example, a linear barcode such as might appear on a cereal box might have 10 decimal digits of information while a one inch square, two dimensional barcode is able to encode the entire U.S. Constitution.

Several standards have evolved regarding the printing, displaying and scanning of barcodes. Using such standards assures that, by printing a barcode following a given standard, the barcode will be readily scanned by a scanner designed to scan that given standard. Each standard has its own pattern of symbols (lines, characters, colors) and rules for encoding data. For example, one standard is the Universal Price Code called U.P.C./EAN. One two-dimensional bar code standard in use today is a QR code, meaning quick response code. The QR code comprises black symbols on a white background and is capable of representing over 4,000 characters of text or over 7,000 digits of numbers. Any known or future representation of information in print/display format is anticipated including, but not limited to, 2-dimensional, three-dimensional, multiple color, hologram, etc.

Figure 4:
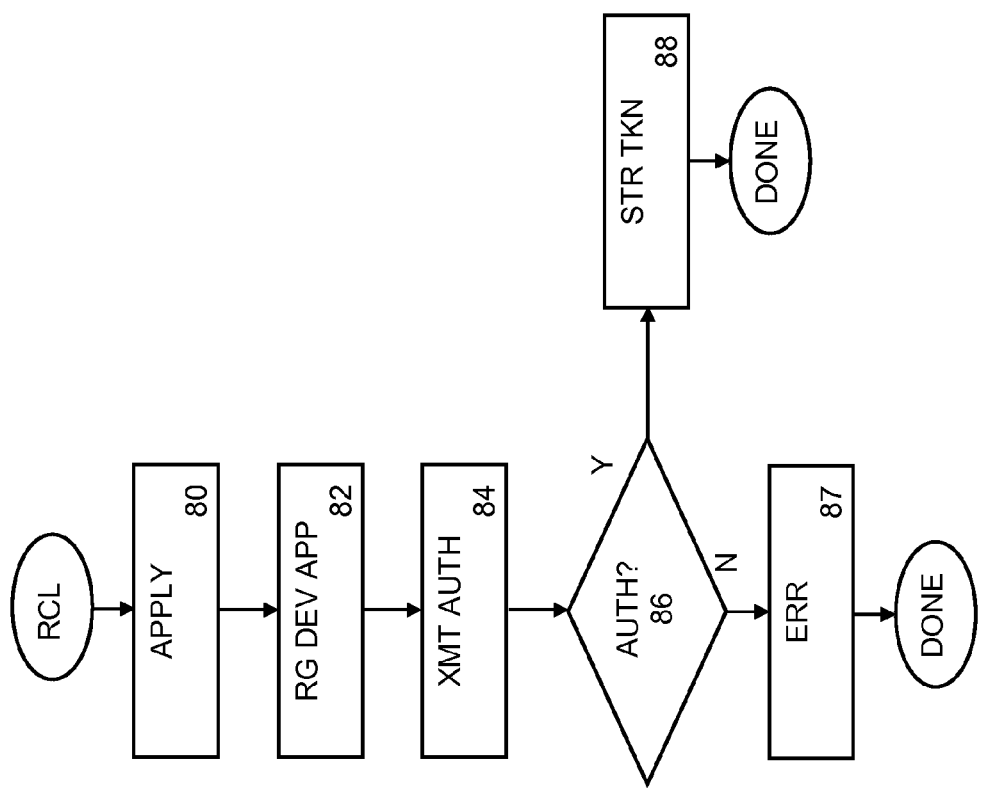
FIG. 4 illustrates a registration flow chart of registering a device in the computer-based funds transfer system.
Figure 5:
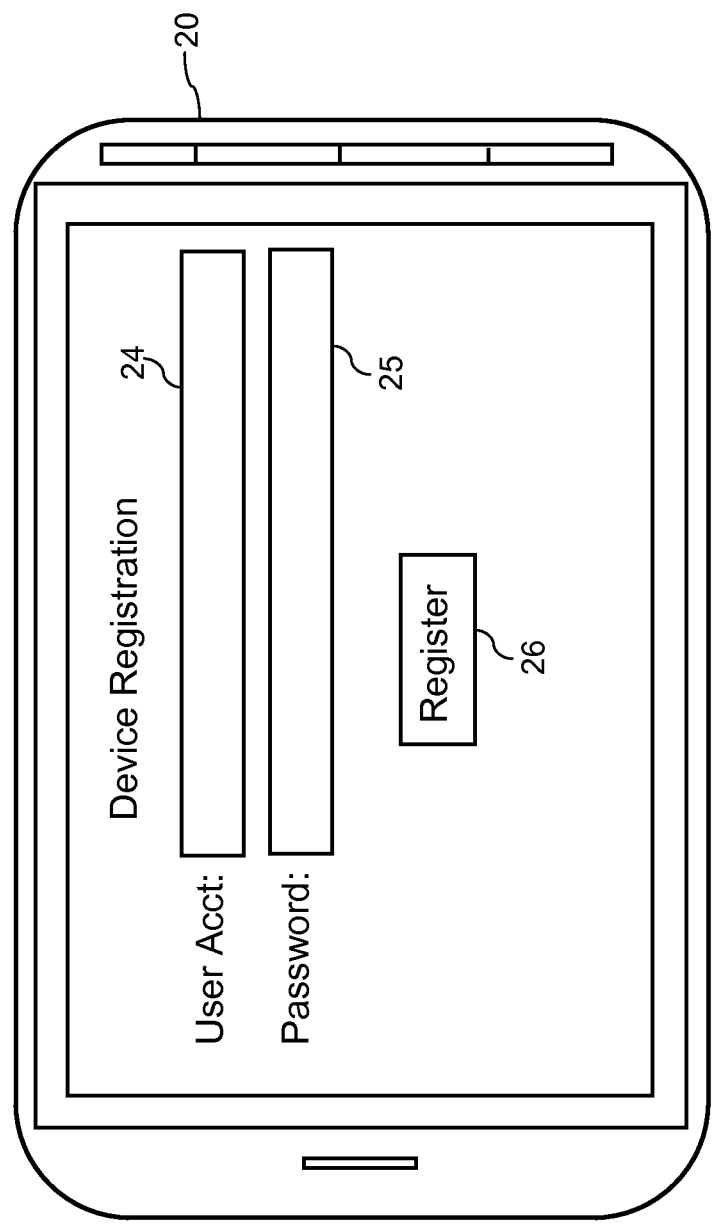
FIG. 5 illustrates a typical registration screen shot of registering a device in the computer-based funds transfer system.

Referring to FIGS. 4 and 5, a registration flow chart of the computer-based funds transfer system and a typical registration screen shot of registering a device in the computer-based funds transfer system are shown. It is preferred to register each client device 20 before allowing the client device 20 to initiate transactions. Before registering the client device 20, the user of the computer-based funds transfer system establishes an account 80, is provide an account number and sets up a password. The process of setting up a financial account is well known in the industry. In this case, setting up of the financial account includes setting up funding by, for example, transferring funds to the computer-based funds transfer system and/or linking external accounts to the user's new account such as external bank accounts, credit card accounts and other accounts such as PayPal. Next, the user registers 82 the client device 20 by downloading and running an application on the client device that presents a data entry screen. A typical data entry screen is shown in FIG. 5. Typically, the user provides sufficient information as to properly identify and authorize before the computer-based funds transfer system registers the client device 20. In the exemplary data entry screen shown in FIG. 5, the user is prompted to enter their account number 24 and password 25, then select the "Register" icon, at which time the application running on the device sends 85 the registration information to the transaction server 40. It is anticipated that in other embodiments, other data is required to authorize the user such as data entered during the application process, for example, date of birth, mother's maiden name, last four digits of a social security number, answers to pre-established questions, etc.

The transaction server 40 receives the registration information and authorized the user against stored account information 42. If the user is found to be authorized 86, the client device 20 is registered as known in the industry. For example, a token (or cookie) is stored 88 on the client device 20, the serial number of the client device 20 is saved in the account information 20, the MAC address of the client device 20 is saved in the account information 20, combinations of such, etc. Now, the client device has a token (cookie) or other way to identify itself to the transaction server 40 each time the user attempts to initiate a transaction from that specific client device 20. In security parlance, there are three general concepts to security: who you are, what you have and what you know. The token (cookie), serial number and/or MAC address (for example) is the "what you have." In some embodiments, a password or pin is required to initiate a transaction. This is the "what you know" part. In still some embodiments, a biological parameter is needed such as a fingerprint scan, retinal scan, voice print, DNA sample, etc. This is the "who you are" part. In various embodiments, any combination of security requirements is anticipated in order to initiate a transaction.

If authorization fails 86, an error message is displayed 87. In some embodiments, multiple attempts to register the client device 20 are allowed. In some embodiments, there are a limited number of attempts allowed, after which, the user must perform additional steps to "unlock" their account. This feature helps reduce the possibility of an unauthorized user (e.g. hacker) accessing the user's account.

Figure 6:
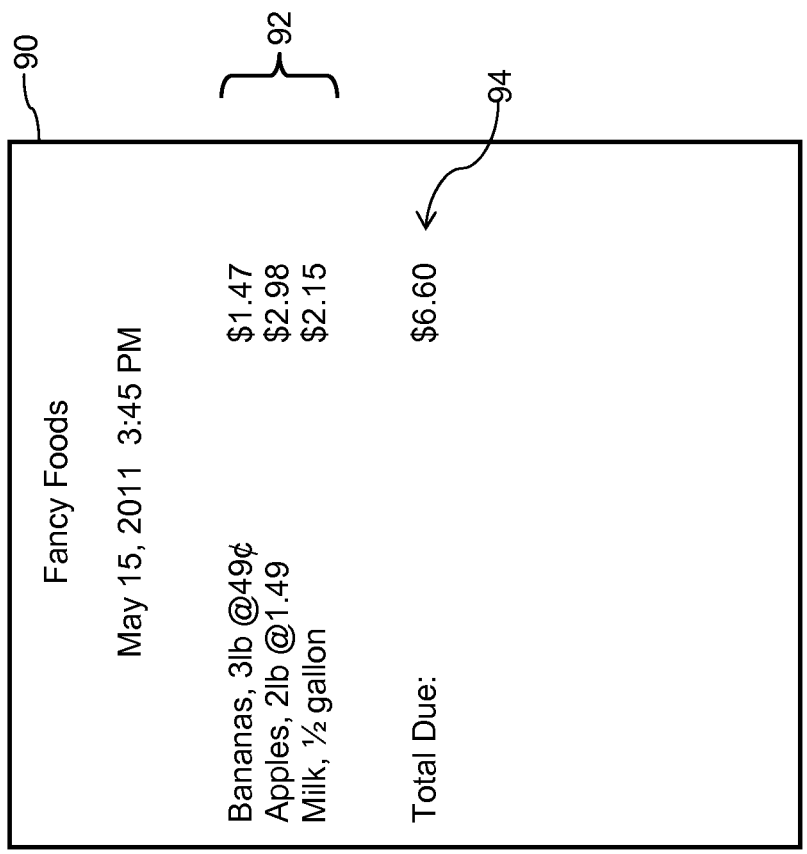
FIG. 6 illustrates a typical purchase transaction.

Referring to FIG. 6, a typical purchase transaction is shown. Any type of transaction is anticipated including purchases of goods, purchases of services, payment of a debt, or any transaction in which hard currency, checks, credit cards, debit cards, etc., were used in the past. The example shown in FIG. 6 is a simplified example of a purchase of goods transaction 90. In this transaction, three items 92 were purchased and $6.60 is due 92. Again, any type of transaction is anticipated.

Figure 7:
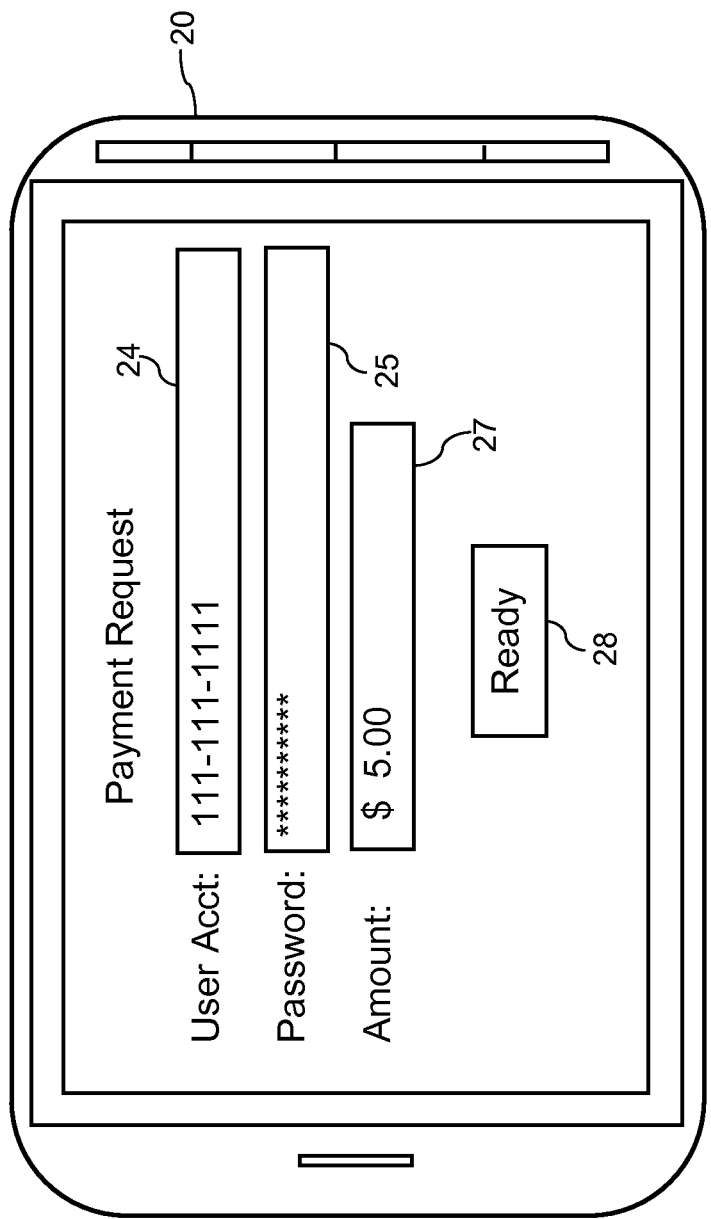
FIG. 7 illustrates a typical data entry screen for initiating a transaction.

Referring to FIG. 7, a typical data entry screen for initiating a transaction is shown. After a transaction is made as in the purchase transaction shown in FIG. 6, the user initiates a transaction with the transaction server 40 through an application on their client device (e.g. cell phone) 20. A typical application screen is shown in FIG. 7. Although in some embodiments, more or less data is required to initiate a transaction, the example in FIG. 7 requires the user to enter their account number 24, password 25, and the amount of the transaction 27. In some embodiments, instead of the account number 24 and password 25, the user enters a pin (not shown). Once the user enters the required information 24/25/27, the user selects the "Ready" feature and the transaction is sent to the transaction server 40. If the initiation is successful, the application then displays the bar code as, for example, shown in FIG. 3.

Figure 8:
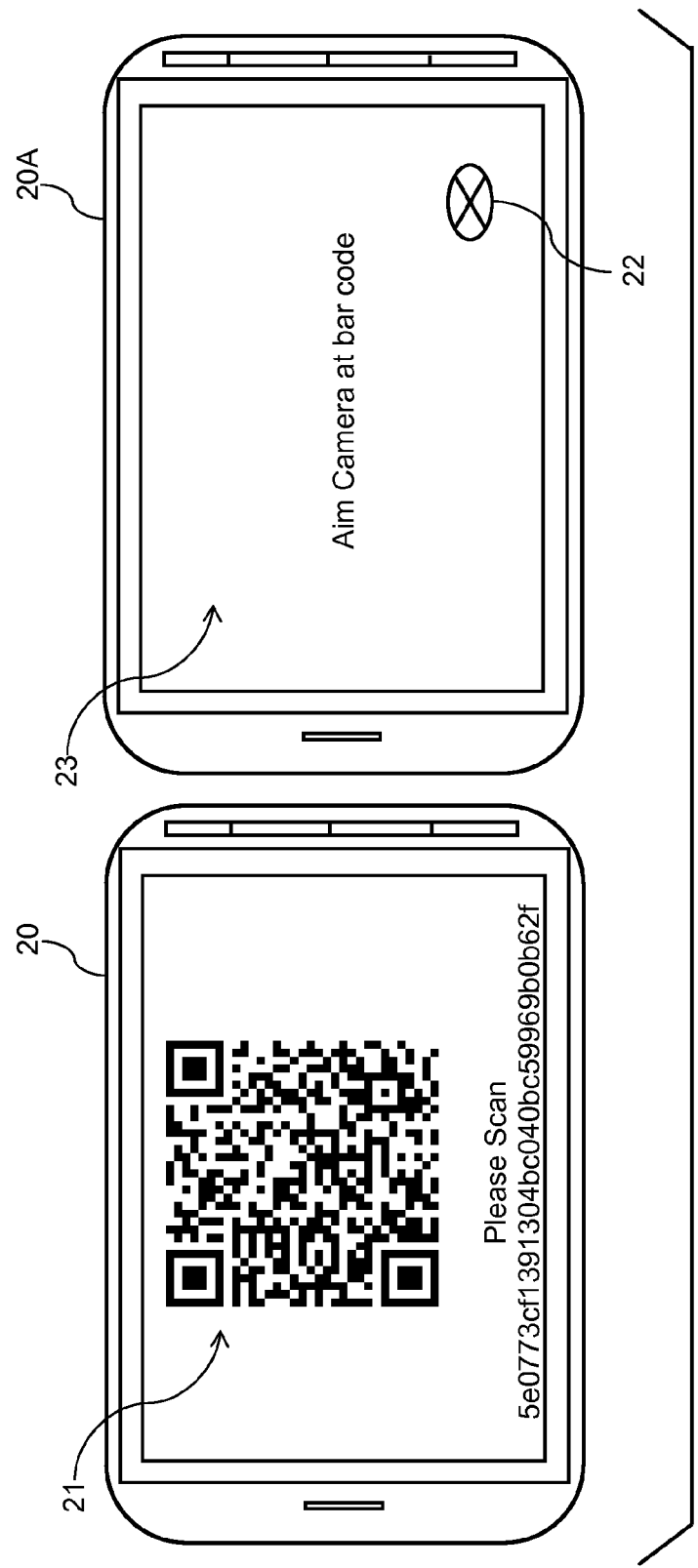
FIG. 8 illustrates a typical cell phone to cell phone transaction.

Referring to FIG. 8, a typical cell phone 20 to cell phone 20A transaction is shown. In this, two users of the computer-based funds transfer system have each registered a client device 20/20A, a first cell phone 20 is registered to the first user and a second cell phone 20A is registered to the second user. In this example, the first user owes $5.00 (five dollars) to the second user. The first user has initiated the transaction for $5.00 (as shown in FIG. 7) and the bar code 21 is properly displayed on the first user's cell phone 20. The second user instructs the computer-based funds transfer application on their cell phone 20A to receive a payment and a payment reception screen 23 is displayed instructing the second user to aim a camera of their cell phone 20A at the display of the first user's cell phone 20. In some embodiments, the scan of the bar code 21 is automatic while in other embodiments, the user must press the shutter button 22 (soft key or hard key) to initiate the scan of the bar code 21. The second user then aims their camera at the bar code 21 displayed on the first user's cell phone 20, optionally presses the shutter button 22 and the second user's cell phone 20A captures the bar code and processes a transaction to credit the second user's account with the amount of the transaction ($5.00) as indicated in the bar code.

Although $5.00 is used as an example, any amount and any currency is anticipated.

Figure 9:
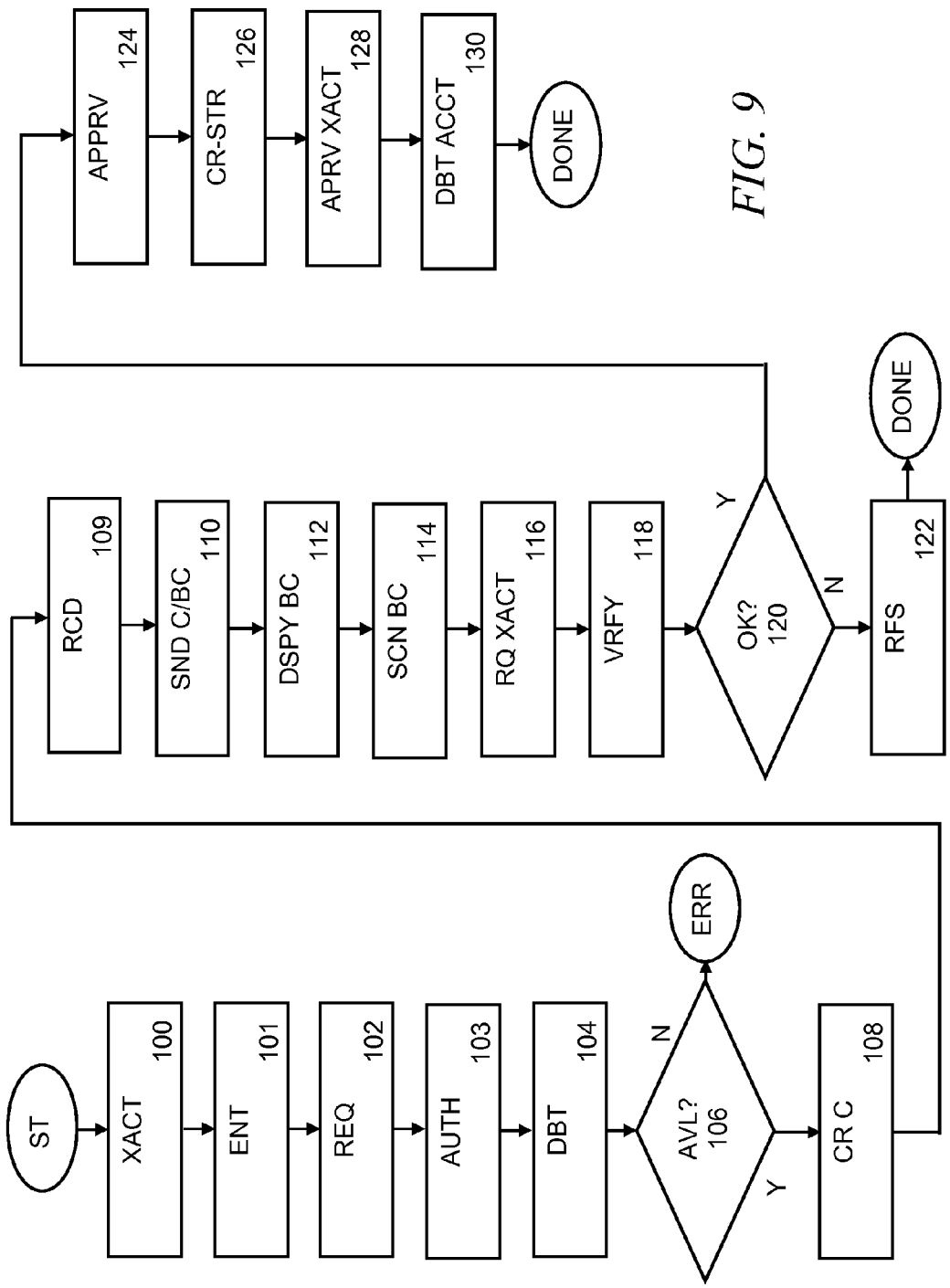
FIG. 9 illustrates a typical flow of the computer-based funds transfer system.

Referring to FIG. 9, a typical flow of the computer-based funds transfer system is shown. This flow begins when a transaction is made 100 such as any known financial transaction including, but not limited to, making a purchase 90 at an establishment, paying a debt (see FIG. 8), providing money to a friend, ordering food from a menu at a restaurant, etc. In this transaction 100, a cash amount is entered (e.g. dollars and cents) in a field of an application running on a client device 20, for example as shown in FIG. 7. The registered user of the computer-based funds transfer system enters a request 101 at a client terminal device 20 such as a cellular phone 20, entering the cash amount. Although there are many ways to implement entering 101 the cash amount into the client terminal device 20, it is anticipated that an application is run on the client terminal device 20 and the amount is entered into a data entry screen of the application, for example, as shown in FIG. 7.

Next, a payment initiation transaction is sent 102 to a server of the computer-based funds transfer system. The payment initiation transaction includes identifying information, security information and the cash amount. Once the client device is verified as an authorized device 103, the computer-based funds transfer system then makes one or more transaction to debit 104 the user's account or accounts in the cash amount. If the funds cannot be obtained 106, an error has occurred and the user is notified.

If the funds are obtained 106, a unique code 21 (unique to the system) is created 108. The code 21 is, for example, a random number, pseudo-random number, hash value, date/time or any combination of such. The code 21 is associated with the transaction data 109 stored at the transaction server 40 and the code 21 is used later when the request transaction is received to access the transaction data and verify the transaction. In some embodiments, the code is encoded as a bar code 21 109 at the transaction server 40 and sent 110 to the client terminal device 20 where the bar code is displayed 112 on a display of the client terminal device 20. In some embodiments, the code is created at the transaction server 40 and sent 110 to the client terminal device 20 as data and the client terminal device uses the code is used to generate a display code 21 (e.g. bar code) and the display code 21 is displayed 112 on a display of the client terminal device 20. The debit amount is recorded 109 at the computer-based funds transfer system along with a code 21.

In some embodiments, the code 21 is generated on the client device 20 and the code 21 is sent to the transaction server 40 as part of the payment initiation transaction to the transaction server 40.

Next, the bar code 21 is scanned 114 from the display of the client terminal device 20 by the recipient of the transfer (e.g. the establishment where the purchase is being made, a client device 20A of another user, etc.) and the computer system of the establishment (e.g. retail store, client device 20A) formats and sends a request of payment 116 based upon the scanned bar code 21, requesting the same amount as the cash amount. In some embodiments, to simplify acceptance by certain establishments, the same back-end process is used to reconcile the bar code 21 as is normally used to reconcile coupons. Once received by the transaction server 40, the transaction is verified 118 to make sure that the sending client terminal device 20 is authorized, the request is proper and, in a preferred embodiment, that the cash amount is the same as the user's account was previously debited.

If the verification 118 fails 120, the transaction is refused 122. Otherwise, the transaction is approved 124 and the recipient (e.g. establishment's server 30) receives a credit 126 or a funds transfer is made between the transaction server 40 and the establishment's server 40 or to an account for the establishment and a transaction is sent 128 back to recipient (e.g. the establishment's server 30) committing to the payment of the cash amount. The user's account is then debited 130 for the cash amount.

Figure 10:
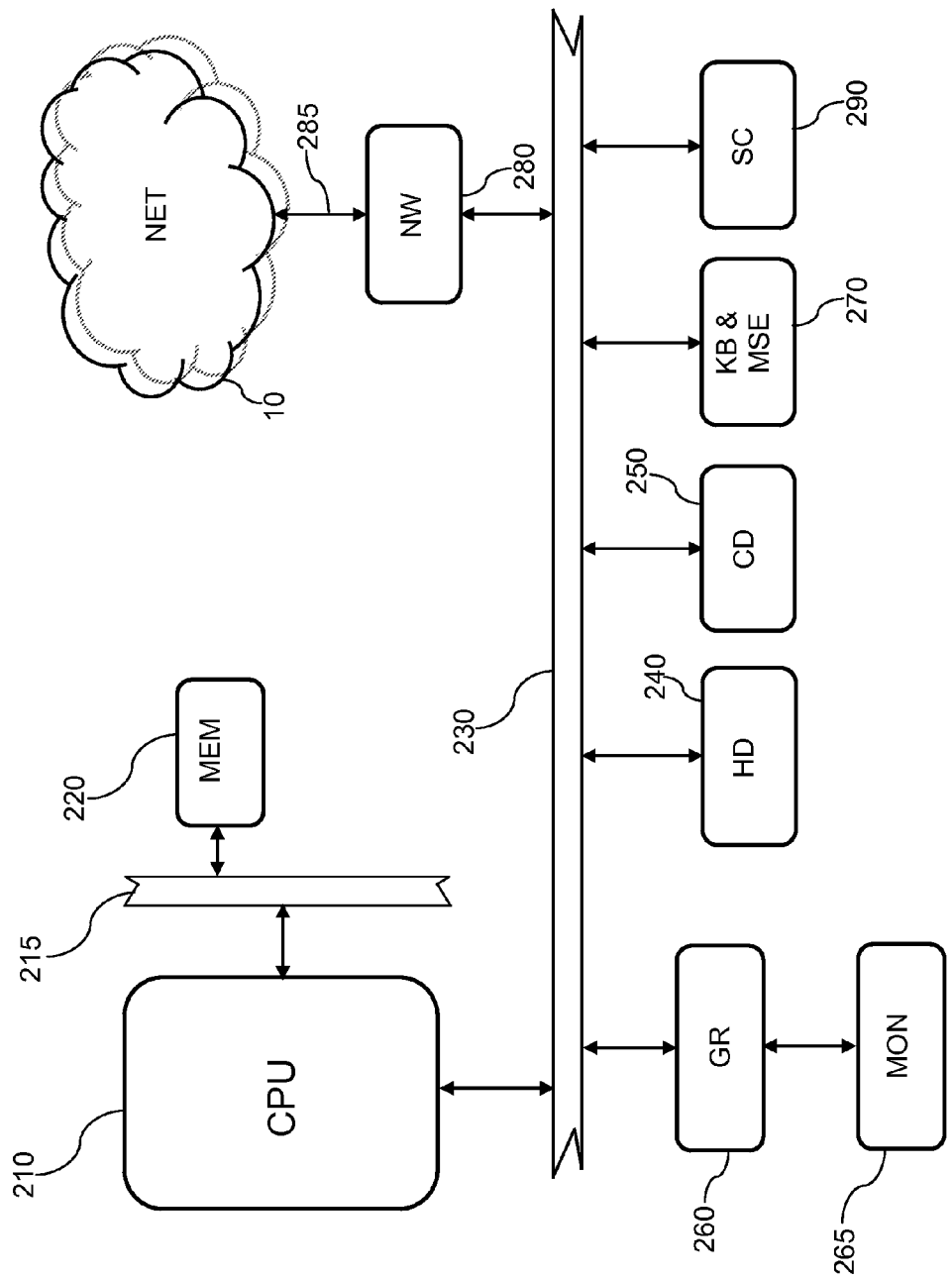
FIG. 10 illustrates a schematic view of a typical computer as used in the computer-based funds transfer system.

Referring to FIG. 10, a schematic view of a typical computer system is shown. The example computer system represents a typical computer system used as the server 40 and/or the user terminal devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 10, a multiple processor system where multiple processors share resources such as memory and storage, a multiple server system where several independent servers operate in parallel (perhaps having shared access to the data or any combination). In any of these systems, a processor 210 executes or runs stored programs that are generally stored for execution within a memory 220. The processor 210 is any processor or a group of processors, for example an Intel Pentium-4® CPU or the like. The memory 220 is connected to the processor by a memory bus 215 and is any memory 220 suitable for connection with the selected processor 210, such as SRAM, DRAM, SDRAM, RDRAM, DDR, DDR-2, etc. Also connected to the processor 210 is a system bus 230 for connecting to peripheral subsystems such as a network interface 280, a hard disk 240, a disk drive (e.g. DVD, CD) 250, a graphics adapter 260 and a keyboard/mouse 270. The graphics adapter 260 receives commands and display information from the system bus 230 and generates a display image that is displayed on the display 265.

In general, the hard disk 240 is used to store programs, executable code and data persistently, while the disk drive 250 is used to load CD/DVD/Blu-ray disk having programs, executable code and data onto the hard disk 240. These peripherals are examples of input/output devices, persistent storage and removable media storage. Other examples of persistent storage include core memory, FRAM, flash memory, etc. Other examples of removable media storage include CDRW, DVD, DVD writeable, Blu-ray, compact flash, other removable flash media, floppy disk, ZIP®, etc. In some embodiments, other devices are connected to the system through the system bus 230 or with other input-output connections/arrangements as known in the industry. Examples of these devices include printers; graphics tablets; joysticks; and communications adapters such as modems and Ethernet adapters.

The network interface 280 connects the computer-based system to the network 10 through a link 285 which is, preferably, a high speed link such as a cable broadband connection, a Digital Subscriber Loop (DSL) broadband connection, a T1 line, or a T3 line.

Some computer systems include a scanner 290 such as a bar code scanner 290, camera 290 or paper scanner 290, all of which are capable of scanning the bar code 21 and converting the scanned bar code into the code.

Figure 11:
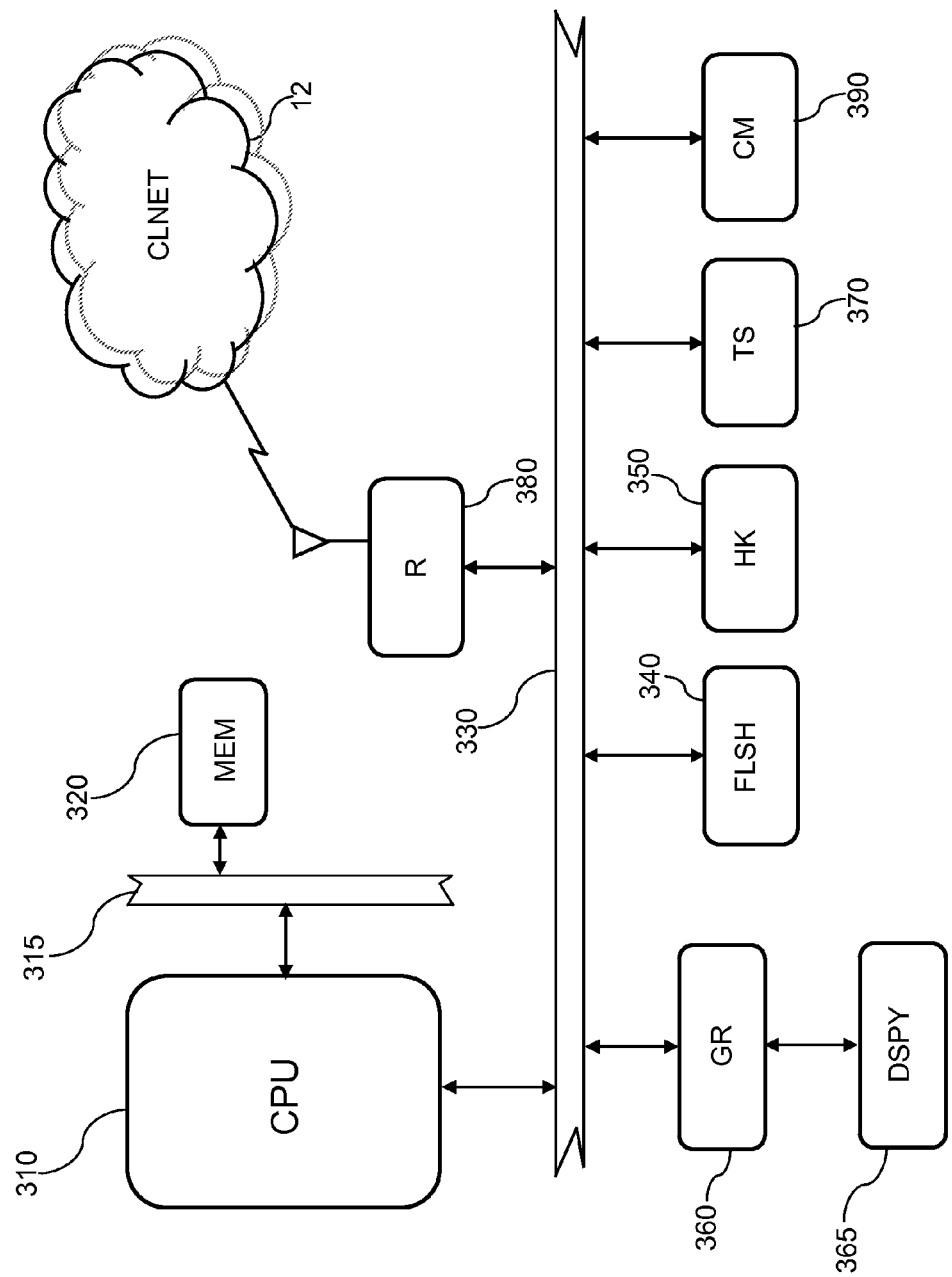
FIG. 11 illustrates a schematic view of a typical client device as used in the computer-based funds transfer system.

Referring to FIG. 11, a schematic view of a typical client device 20 is shown. The example client device 20 represents a typical terminal device 20 such as a cellular phone 20 or tablet computer 20. The example terminal device 20 is shown in its simplest form, having a single processor. Many different computer architectures are known that accomplish similar results in a similar fashion and the present invention is not limited in any way to any particular computer system. In typical terminal device systems 20, a processor 310 executes or runs stored programs that are generally stored for execution within a memory 320. The processor 310 is any processor or a group of processors, for example an Intel ION CPU or the like. The memory 320 is connected to the processor 310 by a memory bus 315 and is any memory 320 suitable for connection with the selected processor 210, such as SRAM, DRAM, SDRAM, RDRAM, DDR, DDR-2, etc. Also connected to the processor 310 is a system bus 330 for connecting to peripheral subsystems such as a cellular network interface 380 (e.g. radio section), flash memory 340, hard keys 350, a graphics adapter 360, a touch screen interface 370, and a camera 390. The graphics adapter 360 receives commands and display information from the system bus 330 and generates a display image that is displayed on the display 365.

In general, the flash 340 is used to store programs, executable code and data persistently (e.g. tokens/cookies). These peripherals are examples of input/output devices, persistent storage and removable media storage. Other examples of persistent storage include core memory, FRAM, flash memory, etc. In some embodiments, some or all of the flash memory 340 is removable, for example, a flash memory card. In some embodiments, other devices are connected to the system through the system bus 230 or with other input-output connections/arrangements as known in the industry. Examples of these devices include graphics interfaces, computer interfaces (e.g. USB), other network adapters (e.g. 802.11 or Bluetooth).

The cellular network interface 380 connects the terminal device 20 to, for example, the cellular network 12. The cellular network interface 380 provides for data transmission for data packets such as transactions data and for voice packets in the example of a cell phone 20.

The camera 390 is often provided in such terminal devices 20 for taking still images and motion video. In some embodiments of the computer-based funds transfer system, the camera 390 is used to capture a bar code 21 for transactions between, for example, two cell phones 20/20A.

Figure 12:
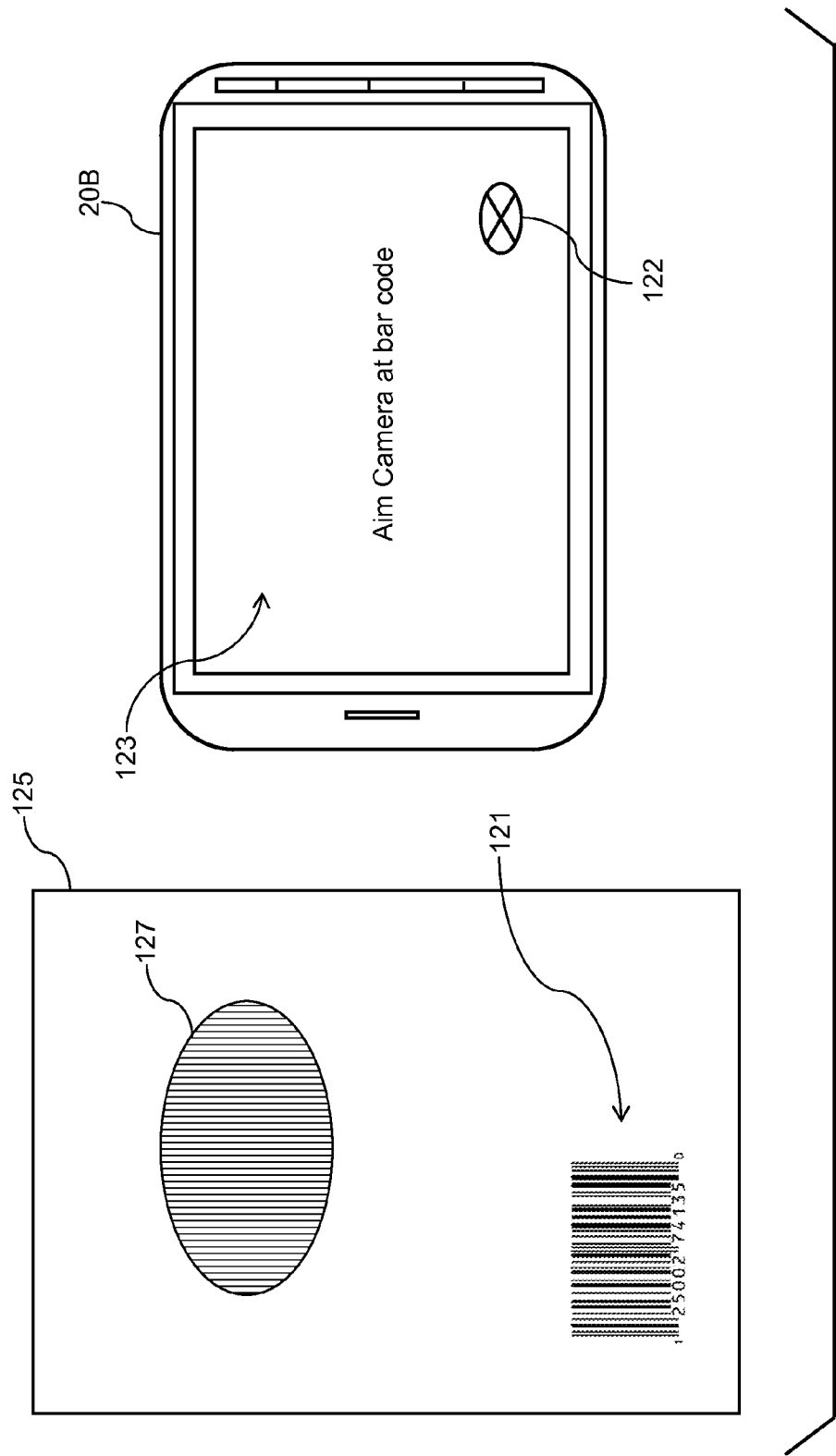
FIG. 12 illustrates an item scan to a cell phone.

Referring to FIG. 12, an item scan to a cell phone is shown. In this, a user of the computer-based funds transfer system uses a registered client device 20 (e.g. a cell phone 20) to scan a product bar code 121. In this example, the product bar code 121 is shown on a package 125 that holds the product 127. Any product bar code 121 is anticipated such as product bar codes 121 on product labels (e.g. computer labels, phone labels), product bar codes 121 on cartons/boxes, product bar codes 121 displayed in advertisements, etc. The user has initiated the computer-based funds transfer application on their cell phone 20B to scan a product bar code 121 and a product scan instruction screen 123 is displayed instructing the second user to aim a camera of their cell phone 20B at the product bar code 121. In some embodiments, the scan of the bar code 21 is automatic while in other embodiments, the user must press the shutter button 122 (soft key or hard key) to initiate the scan of the product bar code 121. The user aims their camera at the product bar code 121, optionally presses the shutter button 22 and the product bar code 121 is scanned. Although there are many uses for scanning product bar codes 121 such as to check prices, etc., it is anticipated that, in some embodiments, the user scans the product bar codes 121 of products 125/127 as they place the products 125/127 into a shopping cart, thereby automating the check-out process which is integrated with the computer-based funds transfer payment system.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A computer-based funds transfer system comprising:
a client device, the client device having a processor and a display;
a transaction server computer system;
a bar code reader;
an establishment computer system, the bar code reader operatively coupled to the establishment computer system; and
software running on the transaction server computer system, the software receives a payment initiation transaction from the client device, the payment initiation transaction includes a cash amount, the software allocates funds covering the cash amount, the software transmits a one-time code back to the client device in an approval transaction where a bar code representing the one-time code is displayed on the display of the client device;
the bar code is read by the establishment computer system using the bar code reader;
either a payer enters a purported amount into the establishment computer system or the payer provides the purported amount to a payee and the payee enters the purported amount into the establishment computer system;
the establishment computer system converts the bar code into the one-time code and the establishment computer system sends a payment request transaction to the transaction server computer system, the payment request transaction includes the purported amount and the one-time code; and
the software running on the transaction server computer system compares the purported amount to the cash amount and if the purported amount equals the cash amount and the one-time code is valid, the transaction server approves the payment request transaction, sends a payment confirmation transaction to the establishment computer system and debits the cash amount from the funds, and if the purported amount does not equal the cash amount or the one-time code is invalid, the transaction server denies the payment request transaction and sends a denial transaction to the establishment computer system;

wherein, the payment request transaction further includes at least one additional item selected from the group consisting of a list of items purchased, quantities of each item purchased, a unit price of each item purchased, extended prices, tax, a name of an establishment, a phone number of the establishment, an identification of the recipient, a phone number of the recipient, a time, and a date, the at least one additional item recorded for report generation.

2. The computer-based funds transfer system of claim 1, whereas the software allocates the funds by debiting an account within the transaction server computer system.

3. The computer-based funds transfer system of claim 1, whereas the software allocates the funds by requesting the funds from one or more external financial servers.

4. The computer-based funds transfer system of claim 1, whereas the software allocates the funds by debiting an account within the transaction server computer system and by requesting additional funds from one or more external financial servers.

5. The computer-based funds transfer system of claim 1, whereas the software further formats the one-time code into the bar code and sends the bar code to the client device instead of sending the one-time code to the client device.

6. The computer-based funds transfer system of claim 1, wherein the client device is a cell phone.

7. A method of transferring funds from a payer to a recipient, the method comprising:
   (a) owing the recipient a cash amount;
   (b) entering the cash amount at a client device, the client device associated with the payer;
   (c) transferring a payment initiation transaction from the client device to a transaction server, the payment initiation transaction including authorization data and the cash amount;
   (d) responsive to receiving the payment initiation transaction at the transaction server, allocating funds to cover the cash amount;
   (e) transmitting an approval transaction from the transaction server to the client device, the approval transaction containing a one-time code;
   (f) displaying the one-time code as a bar code on a display of the client device;
   (g) scanning the bar code being displayed on the display by a scanning device and extracting the one-time code from the bar code, the scanning device interfaced to a recipient system;
   (g1) either entering a purported cash amount into the recipient system by the payer or conveying the purported cash amount from the payer to the recipient and the recipient entering the purported cash amount into the recipient system;
   (h) sending a payment request transaction from the recipient system to the transaction server, the payment request transaction including the one-time code and the purported cash amount;
   (i) responsive to receiving the payment request transaction by the transaction server, validating the one-time code and the purported cash amount;
   (j) if the one-time code is valid and the purported cash amount equals the cash amount, debiting the cash amount from the funds and sending a payment confirmation transaction from the transaction server to the recipient system and transferring the cash amount to the recipient; and
   (k) if the one-time code is invalid or the purported cash amount does not equal the cash amount, denying the request and sending a denial transaction from the transaction server to the recipient system;

wherein, the payment request transaction further includes at least one additional item selected from the group consisting of a list of items purchased, quantities of each item purchased, a unit price of each item purchased, extended prices, tax, a name of an establishment, a phone number of the establishment, an identification of the recipient, a phone number of the recipient, a time, and a date, the at least one additional item recorded for report generation.

8. The method of claim 7, wherein the client device is a first cell phone.

9. The method of claim 7, wherein the recipient system is a second cell phone and the scanner is a camera integrated into the second cell phone.

10. The method of claim 7, wherein the step of allocating the funds to cover the cash amount includes debiting the funds from an internal account to the transaction server.

11. The method of claim 7, wherein the step of allocating the funds to cover the cash amount includes the transaction server initiating one or more transactions with external financial servers.

12. The method of claim 7, wherein the step of allocating the funds to cover the cash amount includes a combination of debiting the funds from an account internal to the transaction server, and the transaction server initiating one or more transactions with external financial servers.

13. A computer-based funds transfer system comprising:
   a client device, the client device having a first processor and a display;
   a transaction server computer system;
   a recipient device, the recipient device having a second processor, a second display and a means for reading a bar code; and
   a first set of software instructions running on the client device, the first set of software instructions receive a cash amount from a user of the client device, creates a payment initiation transaction that includes the cash amount, and transmits the payment initiation transaction to the transaction server computer system;
   a second set of software instructions running on the transaction server computer system, the second set of software instructions receives the payment initiation transaction from the client device that includes the cash amount, the second set of software instructions allocates funds covering the cash amount, the second set of software instructions creates a one-time code, creates an approval transaction comprising the one-time code, and transmits the approval transaction to the client device;
   responsive to receiving the approval transaction, the first set of software instructions running on the client device displays the one-time code as a displayed bar code on the display;
   a third set of software instructions running on the recipient device receives the one-time code from the means for reading the bar code and receives a purported cash amount from the user of the client device, creates a payment request transaction, and sends the payment request transaction to the transaction server computer system, the payment request transaction includes the purported cash amount and the one-time code;

the second set of software instructions running on the transaction server computer system receives the payment request transaction, verifies the one-time code, if the one-time code is valid and the purported cash amount equals the cash amount, creates a payment confirmation transaction, sends the payment confirmation transaction to the recipient device and debits the cash amount from the funds, and if the one-time code is invalid or the purported cash amount does not equal the cash amount, the second set of software creates a payment denial transaction and sends the payment denial transaction to the recipient device; and the third set of software instructions running on the recipient device receives either the payment confirmation transaction or the payment denial transaction and if the payment confirmation transaction was received, displays an approval confirmation message on the second display;

wherein, the payment request transaction further includes at least one additional item selected from the group consisting of a list of items purchased, quantities of each item purchased, a unit price of each item purchased, extended prices, tax, a name of an establishment, a phone number of the establishment, an identification of the recipient, a phone number of the recipient, a time, and a date, the at least one additional item recorded for report generation.

14. The computer-based funds transfer system of claim 13, whereas the software allocates the funds by debiting an account within the transaction server computer system.

15. The computer-based funds transfer system of claim 13, whereas the second set of software instructions running on the transaction server computer system allocates the funds by requesting the funds from one or more external financial servers.

16. The computer-based funds transfer system of claim 13, whereas the second set of software instructions running on the transaction server computer system allocates the funds by debiting an account within the transaction server computer system and by requesting additional funds from one or more external financial servers.

17. The computer-based funds transfer system of claim 13, wherein the client device is a cell phone.

18. The computer-based funds transfer system of claim 13, wherein the recipient device is a cell phone and the means for scanning the bar code is a camera, the camera integrated into the cell phone.

* * * * *